US010210586B2

(12) United States Patent
Odio et al.

(10) Patent No.: US 10,210,586 B2
(45) Date of Patent: Feb. 19, 2019

(54) COMPOSITED POSTING INTERFACE FOR SOCIAL NETWORKING SYSTEM

(75) Inventors: Samuel Odio, Portola Valley, CA (US); Robert Sean Goodlatte, San Francisco, CA (US); Justin Shaffer, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/229,550

(22) Filed: Sep. 9, 2011

(65) Prior Publication Data

US 2013/0066964 A1 Mar. 14, 2013

(51) Int. Cl.
*G06Q 40/00* (2012.01)
*G06Q 50/00* (2012.01)

(52) U.S. Cl.
CPC .................................... *G06Q 50/01* (2013.01)

(58) Field of Classification Search
CPC ....................................................... G06Q 40/00
USPC .......................................................... 705/319
See application file for complete search history.

(56) References Cited

U.S. PATENT DOCUMENTS 8,150,779 B1 * 4/2012 Gauvin ......................... 705/319
8,250,145 B2 * 8/2012 Zuckerberg ............ G06Q 30/02 709/204
8,292,166 B2 * 10/2012 Gomez ................... H04L 51/32 235/380
2002/0099562 A1 * 7/2002 Bruce et al. ...................... 705/1
2005/0235062 A1 * 10/2005 Lunt ...................... G06Q 10/10 709/225
2007/0005419 A1 * 1/2007 Horvitz et al. ................. 705/14
2010/0130226 A1 * 5/2010 Arrasvuori et al. ....... 455/456.1
2011/0004692 A1 * 1/2011 Occhino ................ H04L 67/16 709/228
2011/0066710 A1 * 3/2011 Paul .................... G06F 17/3089 709/222
2011/0161791 A1 * 6/2011 Travis .................... G06Q 10/10 715/205
2011/0161987 A1 * 6/2011 Huang ................... G06Q 10/10 719/318
2011/0196855 A1 * 8/2011 Wable ............... G06F 17/30631 707/711
2011/0260860 A1 * 10/2011 Gupta ...................... 340/539.13

(Continued)

OTHER PUBLICATIONS

Nair, Rahul, and Marc Davis. “Bluetooth pooling to enrich co-presence information.” Adjunct Proceedings of the 7th International Conference on Ubiquitous Computing. 2005.*

(Continued)

*Primary Examiner* — Hani M Kazimi
(74) *Attorney, Agent, or Firm* — Baker Botts L.L.P.

(57) ABSTRACT

In one embodiment, in response to a user's request to upload a photo to a social networking system, a client process accesses information in the user's current location and friends who may be with the user, present the information to the user in a composited posting user interface. After the user confirms a particular current location and a first and second friends who are currently with the user, the client process tags the particular current location and the first and second friends to the photo, and submit to the social networking system a primary posting request in photo upload, and a secondary posting request to check in the user, the first friend and the second friend to the particular current location.

18 Claims, 12 Drawing Sheets

(56) References Cited

U.S. PATENT DOCUMENTS

2015/0332416 A1 * 11/2015 Ben-Yair ................ G06Q 10/00
705/319

OTHER PUBLICATIONS

Ahern, Shane, Simon King, and Marc Davis. "MMM2: mobile media metadata for photo sharing." Proceedings of the 13th annual ACM international conference on Multimedia. ACM, 2005.*

A. Ferscha, C. Holzmann, and S. Oppl, "Context awareness for group interaction support," in MobiWac '04: Proceedings of the Second International Workshop on Mobility Management & Wireless Access Protocols, New York, NY, USA, ACM Press, 2004, pp. 88-97.*

* cited by examiner

FIGURE 5C
AT&T 3G 2:39 PM
Great place for a rainy afternoon
Ally, Mary and Bill are tagged in the photo

COMPOSITED POSTING INTERFACE FOR SOCIAL NETWORKING SYSTEM

TECHNICAL FIELD

The present disclosure generally relates to a social networking system, and more particularly, to a composited posting user interface directed to enabling a user to submit to the social networking system a primary posting request and one or more secondary posting requests at a same time.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. A geo-social networking system is a social networking system in which geographic services and capabilities are used to enable additional social interactions. User-submitted location data or geo-location techniques (e.g., mobile phone position tracking) can allow a geo-social network system to connect and coordinate users with local people or events that match their interests. For example, users can check-in to a place using a mobile client application by providing a name of a place (or selecting a place from a pre-established list of places). The geo-social networking system, among other things, can record information about the user's presence at the place and possibly provide this information to other users of the geo-social networking system.

SUMMARY

Particular embodiments relate to a composited posting user interface directed to enabling a user to submit to a social networking system a primary posting request and one or more secondary posting requests at a same time. These and other features, aspects, and advantages of the disclosure are described in more detail below in the detailed description and in conjunction with the following figures.

DETAILED DESCRIPTION

Figure 1:
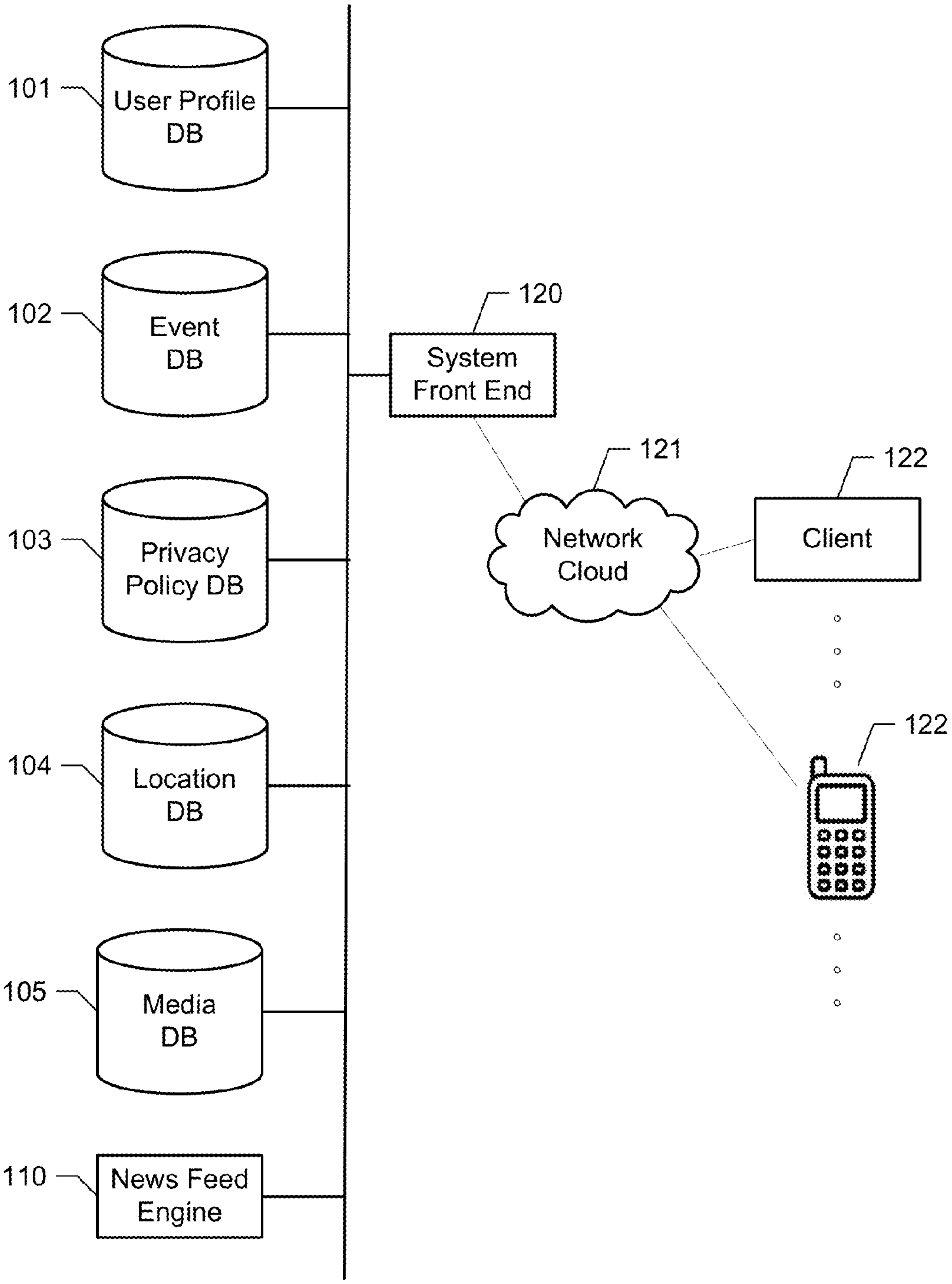
FIG. 1 illustrates an example social networking system.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information.

Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as status updates, wall posts, geo-social networking systems, photo sharing, on-line calendars and events. Users typically navigate to various different views or pages hosted by the social networking system and/or a client application to access this functionality, either to view information or to post information relevant to a given application, such as a user profile page to update a status, or a photo upload section to upload a photo. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

Social networking system may maintain a database of information relating to geographic locations or places. Places may correspond to various physical locations, such as restaurants, bars, train stations, airports and the like. In one implementation, each place can be maintained as a hub node in a social graph or other data structure maintained by the social networking system, as described in U.S. Pat. No. 8,244,848 which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place, in addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The social networking system may automatically checks in a user to a place based on the user's current location and past location data, as described in U.S. Patent Application Publication No. 2012/0233158, which is incorporated by reference herein for all purposes. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. The check-in activity may also be displayed on a user profile page and in news feeds provided to users of the social networking system.

Still further, a special purpose client application hosted on a mobile device of a user may be configured to continuously capture location data of the mobile device and send the location data to social networking system. In this manner, the social networking system may track the user's location and provide various recommendations to the user related to places that are proximal to the user's path or that are frequented by the user. In one implementation, a user may opt in to this recommendation service, which causes the client application to periodically post location data of the user to the social networking system.

A social networking system may support a news feed service. A news feed is a data format typically used for providing users with frequently updated content. A social networking system may provide various news feeds to its users, where each news feed includes content relating to a specific subject matter or topic. Various pieces of content relating to a particular topic may be aggregated into a single news feed. The topic may be broad, such as information relating to various events associated with users within a threshold degree of separation of a subject user, and/or updates to pages that a user has liked or otherwise established a subscriber relationship. Individual users of the social networking system may subscribe to specific news feeds of interest. U.S. Pat. No. 7,669,123, incorporated by reference in its entirety for all purposes, describes a system that can be used to dynamically provide a news feed in a social networking system. A group of related actions may be presented together to a user of the social networking system in the same news feed. For example, a news feed concerning an event organized through the social networking system may include information about the event, such as its time, location, and attendees, and photos taken at the event, which have been uploaded to the social networking system. U.S. application Ser. No. 12/884,010, incorporated by reference in its entirety for all purposes, describes a system that can be used to construct a news feed comprising related actions and present the news feed to a user of the social networking system.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. For example, a user may register with an existing event by accessing a client application to confirm attending the event, and cause the confirmation to be stored in event database 102. In particular embodiments, the social networking system may store user privacy policy data in privacy policy database 103. In particular embodiments, the social networking system may store geographic and location data in location database 104. In particular embodiments, the social networking system may store media data (e.g., photos, or video clips) in media database 105. In particular embodiments, databases 101, 102, 103, 104, and 105 may be operably connected to the social networking system's front end 120 and news feed engine 110. In particular embodiments, the front end 120 may interact with client device 122 through network cloud 121. For example, the front end 120 may be implemented in software programs hosted by one or more server systems. For example, each database such as user profile database 101 may be stored in one or more storage devices. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet, a corporate intranet, a virtual private network, a local area network, a wireless local area network, a wide area network, a metropolitan area network, or a combination of two or more such networks) over which client devices 122 may access the social network system.

In particular embodiments, location database 104 may store an information base of places, where each place includes a name, a geographic location and meta information (such as the user that initially created the place, reviews, comments, check-in activity data, one or more web pages associated with the place and corresponding links to the one or more web pages, and the like). Places may be created by administrators of the system and/or created by users of the system. For example, a user may register a new place by accessing a client application to define a place name and provide a geographic location and cause the newly created place to be registered in location database 104. As described in U.S. patent application Ser. No. 12/763,171, information about a created place may be stored in a hub node in a social graph, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place or check in to the place. In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, additional information of a place can be business hours, photos, or user reviews of the place. In particular embodiments, location database 104 may store a user's location data. For example, a user can create a place (e.g., a new restaurant or coffee shop) and the social networking system can store the created place in location database 104. For example, location database 104 may store a user's check-in activities. For example, location database 104 may store a user's geographic location provided by the user's GPS-equipped mobile device.

In particular embodiments, a user of the social networking system may upload one or more media files to media database 105. For example, a user can upload a photo or a set of photos (often called a photo album), or a video clip (or an audio clip) to media database 105 from a client device 122 (e.g., a computer, or a camera phone). In particular embodiments, the one or more media files may contain metadata (often called "tags") associated with each media file. For example, a photo shot by a digital camera may contain metadata relating to file size, resolution, time stamp, name of the camera maker, and/or location (e.g., GPS) coordinates. A user can add additional metadata values to a photo, or tag a photo, during or in connection with an upload process. Some examples of tags of a media file are author, title, comments, event names, time, location, names of people appearing in the media file, or user comment. In particular embodiments, a user may tag a media file by using a client application (e.g., a photo or video editor), or entering one or more tags in a graphical user interface of a media uploading tool that uploads a user's one or more media files from a client device 122 to the social networking system. A user may also tag a media file after an upload at a later time in the social networking system's web site. In particular embodiments, the social networking system may also extract metadata from a media file and store the metadata in media database 105. In one implementation, the client device 122 may implement the Exchangeable image file format (Exif), or a modified version thereof.

In particular embodiments, news feed engine 110 may access user profile database 101, event database 102, location database 104 and media database 105 for data about a particular user of the social networking system, and assemble a list of one or more activities as news items about the particular user. In particular embodiments, news feed engine 110 may access privacy policy database 103 and determine a subset of news items based on one or more privacy settings by the particular user. In particular embodiments, news feed engine 110 may compile a dynamic list of a limited number of news items about the particular user in a preferred order (i.e., a news feed). In particular embodiments, news feed engine 110 may provide links related to one or more activities in the news items, and links providing opportunities to participate in the activities. For example, a news feed about a user can comprise the user's wall posts, status updates, comments on other users' photos, and a recent check-in to a place (with a link to a web page of the place). In other embodiments, news feed engine 110 may access user profile database 101, event database 102, location database 104 and media database 105 and compile a dynamic list of a number of news items about a group of related actions received from users of the social networking system (i.e., a news feed). For example, a news feed can comprise an event that a user may schedule and organize through the social networking system (with a link to participate the event), check-ins at a specific geographical location of the event by the user and other participants of the event, messages about the event posted by the user and other participants of the event, and photos of the event uploaded by the user and other participants of the event. For example, a news feed entry for a photo uploaded by the user may include thumbnail photos of one or more other users tagged in the photo and selectable links to profile pages of the one or more tagged users.

Figure 2:
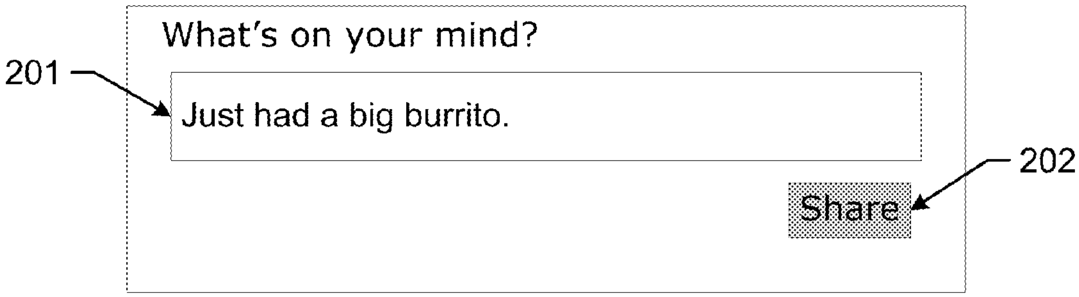
FIG. 2 illustrates an example posting user interface for posting a status update to a social networking system.

A user of the social networking system can post information to the social networking system (e.g., a status update, photo upload, or location check-in) from a posting user interface associated with an application hosted by the user's client device. FIG. 2 illustrates an example posting user interface for posting a status update to the social networking system. In the example posting user interface of FIG. 2, a user can enter a text string in an inline dialog box 201 of a user interface associated with the social networking system, and select a selectable icon 202 ("Share"), causing the web browser application displaying the web page to transmit the posting request to the social networking system. Ordinarily, a posting user interface for posting requests or comments serves a single posting objective—e.g., for posting a status update only, for uploading photos only, checking-in to a location in a geo-social networking system only, or for posting a restaurant review only. Particular embodiments herein describe a posting user interface capable of performing a primary posting objective and one or more secondary posting objectives to the social networking system.

Figure 3:
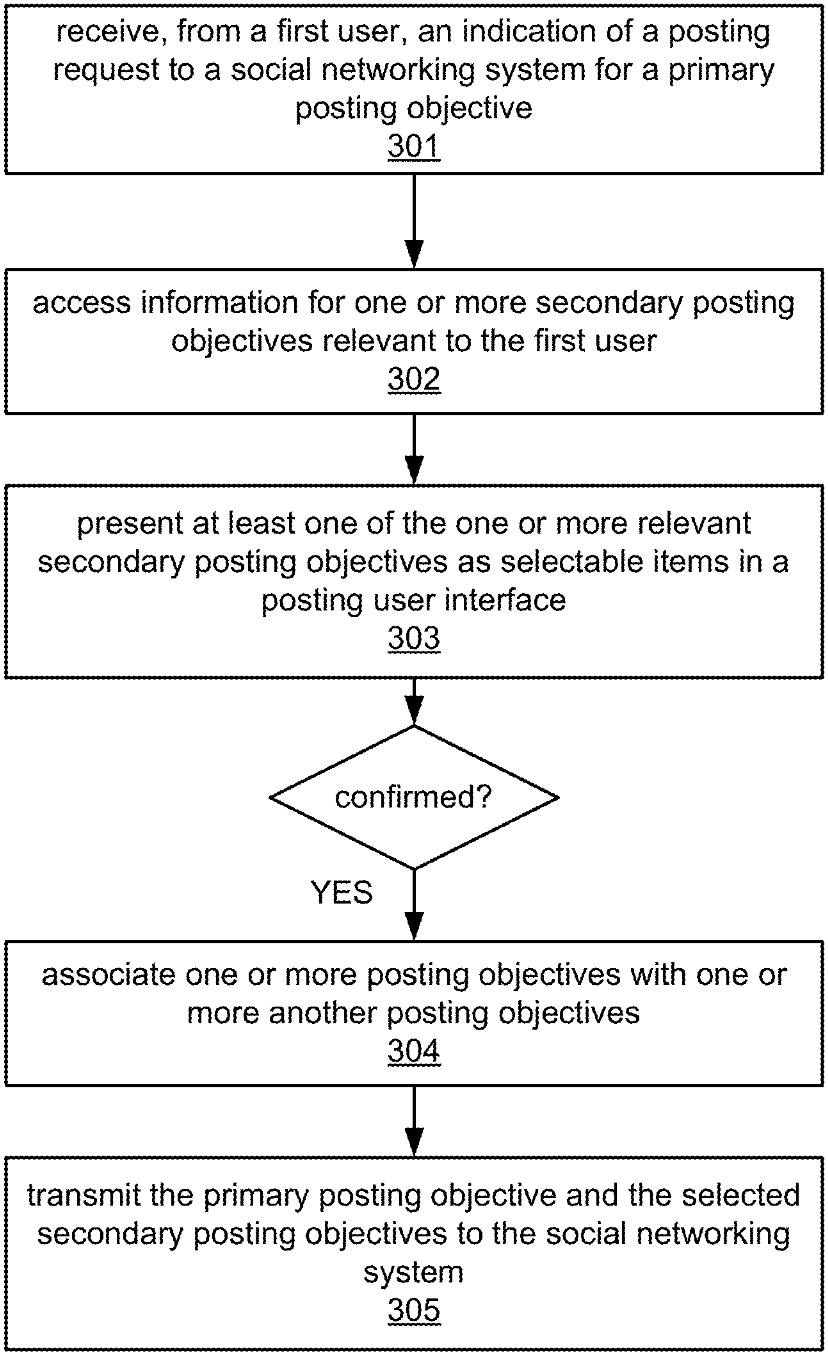
FIG. 3 illustrates an example method of posting a primary posting objective and one or more secondary posting objectives to a social networking system.

FIG. 3 illustrates an example method of posting information directed to a primary posting objective and additional information for one or more secondary posting objectives to the social networking system. FIG. 3 can be implemented by a composited posting application or process hosted by a client device and/or provided in one or more web pages (or other structured documents) hosted by a server. In particular embodiments, the composited posting process may receive from a first user, an indication of a posting request to a social networking system for a primary posting objective (301). For example, a primary posting objective may be a status update, location check-in, or media files upload and tagging. For example, the composited posting process may receive from the first user an indication of a posting request for a status update when the first user starts typing in the dialog box 201 illustrated in FIG. 2.

In particular embodiments, the composited posting process may access information for one or more secondary posting objectives relevant to the first user (302). In particular embodiments, a secondary posting objective may be one or more of a status update, location check-in, or media file upload. For example, information for a secondary posting objective of status update may be a location, an event, and/or one or more first user's social contacts. For example, information for a secondary posting objective of location check-in may be a location or place, and one or more first user's social contacts. For example, information for a secondary posting objective of media files upload may be one or more media files.

The composited posting process may access location database 104 and/or the first user's GPS-equipped mobile device for the first user's current location (e.g., GPS coordinates, a location or a place, or a recent location check-in). For example, the composited posting process may access event database 102 for one or more events in close proximity to the first user's current location, or one or more current events that the first user registers with. U.S. Patent Application Publication No. U.S. 2012/0278387, herein incorporated by reference in its entirety and for all purposes, describes methods of automatically suggesting an event and/or a shared space for uploading requests from multiple users. For example, the composited posting process may access user profile database 101, event data base 102, and/or location database 104, for one or more first user's social contacts who may be with the first user (e.g., a social contact attends a same event or is at a same location with the first user). For example, the composited posting process may access a local storage of the first user's camera phone for one or more media files recently taken by the first user.

Figure 4:
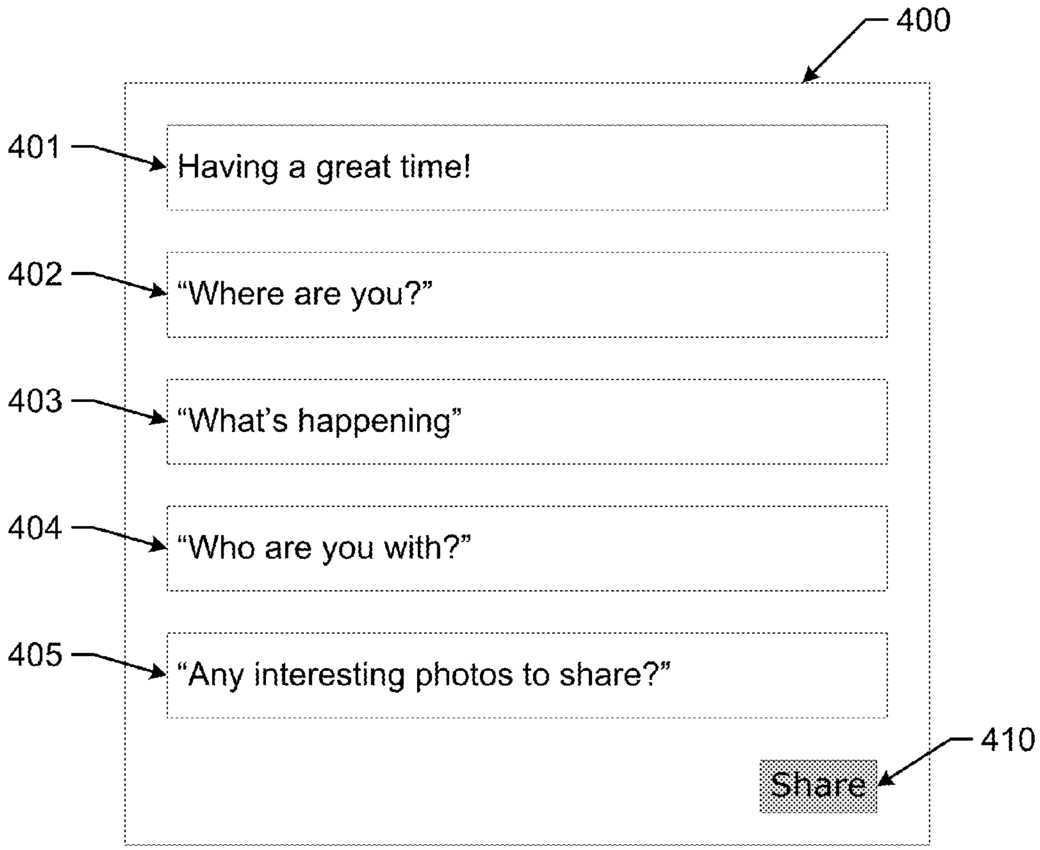
FIGS. 4, 4A, 4B, and 4C illustrate an example composited posting user interface.
Figure 4A:
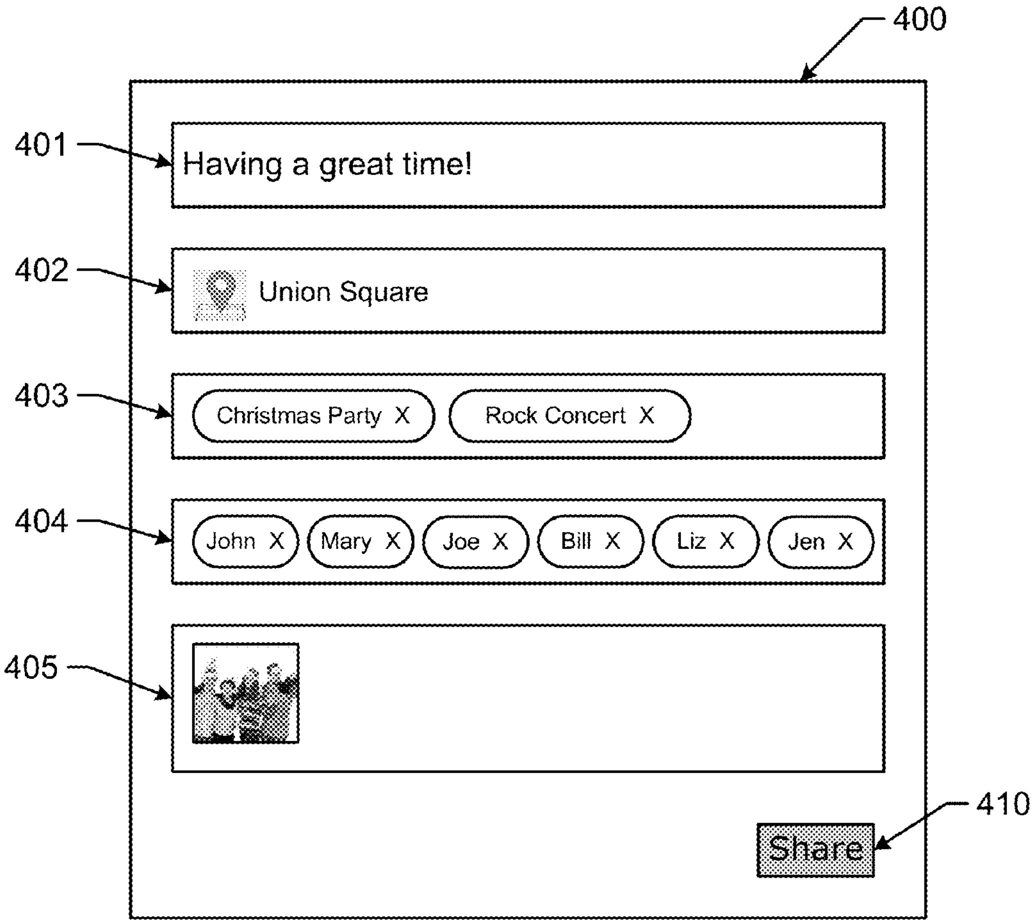

In particular embodiments, the composited posting process may present information and user interface controls directed to at least one of the one or more relevant secondary posting objectives as selectable items in a posting user interface (303). FIG. 4 illustrates an example composited posting user interface. For example, composited posting user interface 400 may comprise input field 401 for a primary posting objective (e.g., status update), and one or more input fields for information for one or more secondary posting objectives. An input field for information for one or more secondary posting objectives can be an input field for a location check-in (402), an input field for an event (403), an input field for social contacts for location check-in and/or photo tagging (404), and/or an input field for media files (405). The composited posting process may automatically populate the composited posting user interface with selectable icons or other user interface controls based on the information for one or more secondary posting objectives, as illustrated in FIG. 4A. For example, the composited posting process may automatically populate input field 402 with a selectable icon for a location that the first user has recently checked in that is also near the current location of the user. For example, the composited posting process may access event database for events that the first user may be currently scheduled or registered as attending and automatically populate input field 403 with selectable icons for the events that the first user may be currently scheduled or registered as attending. For example, the composited posting process may determine one or more first user's social contacts that the first user may be currently with. For example, the composited posting process can access event data base 102 for one or more first user's social contacts who may register a particular current event as the first user. The composited posting process can access location database 104 for one or more first user's social contacts who is in a close vicinity of the first user (e.g., based on check-in activities, recorded GPS coordinates). The composited posting process can access media database 105 for one or more first user's social contacts who are tagged with the first user in a recently uploaded photo. The composited posting process may automatically populate input field 404 with selectable icons corresponding to the one or more first user's social contacts that the first user may be currently with. For example, the composited posting process may automatically populate input field 405 with a selectable photo thumbnail corresponding to a photo that the first user just taken with his mobile phone hosting the composited posting user interface 400.

Figure 4B:
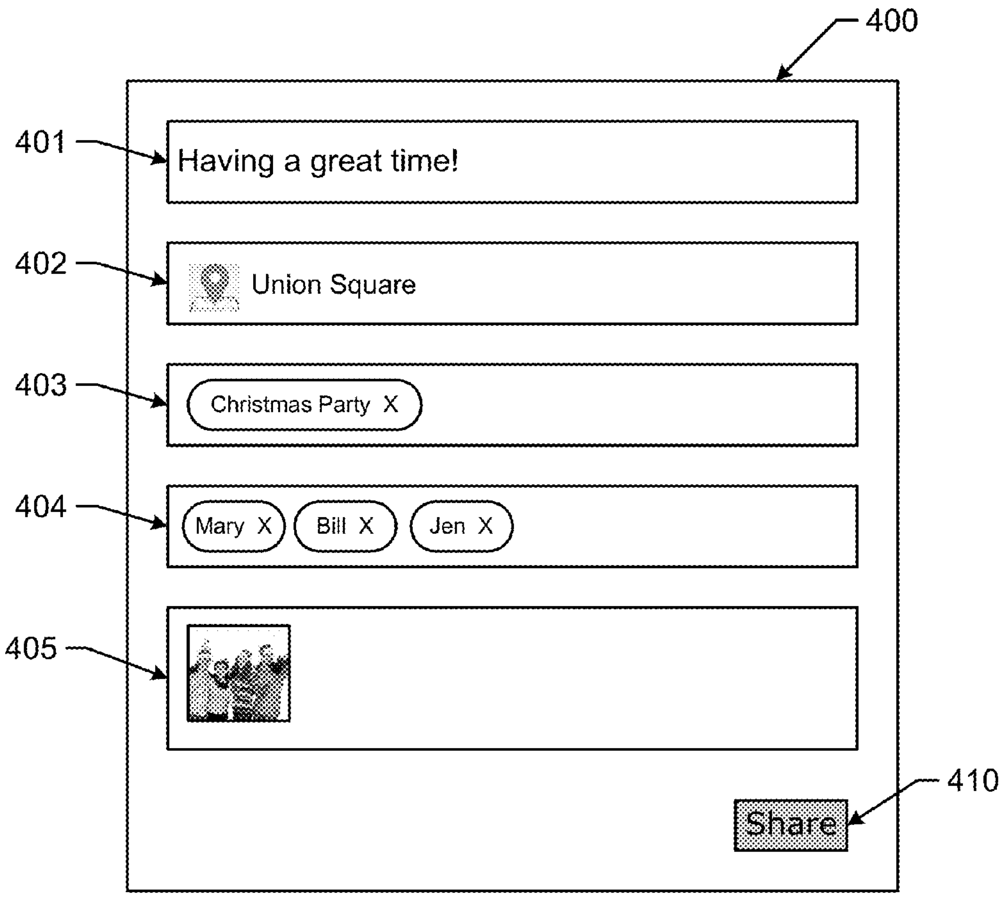

With the suggestions for secondary posting objectives illustrated in FIG. 4A, for example, the first user may select or confirm some of the suggested items for secondary posting objectives, as illustrated in FIG. 4B. The first user may select one or more suggestions by de-selecting unwanted items (e.g., by tapping on an icon or on the X mark of an icon). In other embodiments, the composited posting process may present selectable items in a pull-down menu. For example, the first user may select an event the first user currently attends ("Christmas Party"). For example, the first user may select three friends ("Mary", "Bill", and "Jen") who are with the first user. For example, the first user may confirm the suggested photo in input field 405. Additionally, the first user may manually select or enter one or more items in the input files. For example, the first user can select one or more photos (e.g., by accessing the first user's mobile phone's camera application) for input field 405. For example, the first user can enter one or more names in input field 404. For example, the first user can enter an event name in input field 403.

In particular embodiments, if the first user selects one or more secondary posting objectives, the composited posting process may associate one or more posting objectives with one or more another posting objectives (304). For example, the composited posting process may associate location, event, and/or social contacts information to status update information—e.g., by modifying a text string for status update to "Having a great time with Mary, Bill and Jen!" For example, the composited posting process may associate ("tag") the selected location ("Union Square"), the selected event ("Christmas Party") and the selected friends ("Mary", "Bill", "Jen") to the selected photo.

In particular embodiments, the composited posting process may transmit information directed to the primary posting objective and the selected secondary posting objectives to the social networking system (305). As illustrated in FIG. 4B, in response to the first user's selecting of "Share" icon 410, the composited posting process may transmit a status update request (e.g., "Having a great time with Mary, Bill and Jen" and a time stamp) to the social networking system. The composited posting process may also transmit a check-in request (i.e., a secondary posting objective) to check in the three friends ("Mary", "Bill", "Jen") to the first user's current location ("Union Square"). The composited posting process may transmit a photo upload request (i.e., another secondary posting objective) to the social networking system for the photo corresponding to the photo thumbnail in input field 405.

Figure 4C:
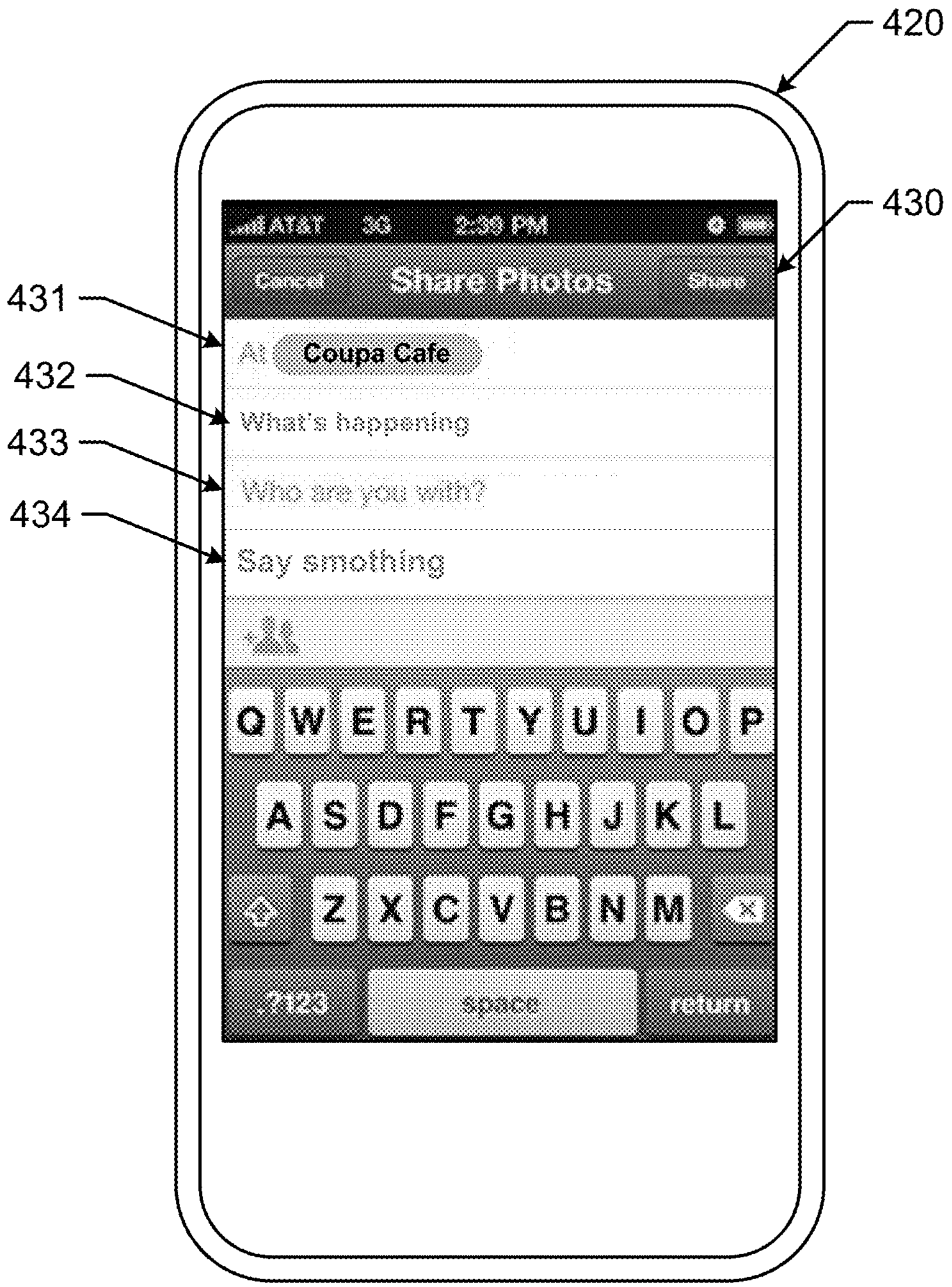

In contrast to the status update posting user interface of FIG. 2, the example composited user interface illustrated in FIGS. 4, 4A, and 4B may enable a user to post information relevant to one or more posting objectives (e.g., location check, photo upload) in addition to the primary objective of a status update. Furthermore, the example composited user interface in FIGS. 4, 4A, and 4B with the example method of FIG. 3 is not limited to a particular primary posting objective of a status update. For example, a composited posting user interface may have photo upload or location check-in as a primary posting objective. FIG. 4C illustrates an example composited posting user interface primarily directed to uploading a photo or other medial file. For example, in response to a user's request to upload a photo from the user's mobile phone 420, the composted posting process may access information directed to the user's current location, and present the information to the user in a composited posting user interface for photo upload 430. Composited posting user interface may comprise an input field for a location check-in (431), an input field for an event (432), an input field for social contacts (433), and an input for status update (434), as illustrated in FIG. 4C, as well as an input field for a status update. After the user confirms the current location ("Coupa Cafe"), entering a first event in input field 432, a first and a second friends in input field 433, and a comment (e.g., a text string) in input field 434, the composted posting process can tag the current location, the first event, and the first and second friends, and the comment to the photo, and submit to the social networking system a primary posting request to a photo upload process, a second posting request for an event registration (e.g., adding the first and the second friends to an attendees list of the first event), a third posting request for a location check-in (e.g., checking in the user, the first friend and the second friend to "Coupa Cafe"), and a fourth posting request for a status update.

After receiving information for a user's primary posting objective and one or more secondary posting objectives transmitted from the composited posting process, the social networking system may cause individual server-side processes to process each of the primary posting request and the one or more secondary posting requests. For example, the social networking system may receive a primary posting request for a status update, a secondary posting request for a location check-in, and another secondary posting request for a photo upload as illustrated in the example of FIG. 4B. The social networking system may cause a first server-side to process the primary posting request (e.g., posting the status update to the user's profile page). The social networking system may cause a second server-side process to process the check-in secondary posting request (e.g., checking in the user's friends to the location indicated in the request and store the check-in activities in location database 104). The social networking system may cause a third server-side process to process the photo-upload secondary posting request (e.g., storing the uploaded photo in media database 105 and adding the photo to a photo album).

Particular embodiments of the composited posting user interface described herein can be used for posting requests to a shared space. U.S. patent application Ser. No. 13/229,241, herein incorporated by reference in its entirety and for all purposes, describes methods of automatically creating a shared space for posting requests to a social networking system from multiple users based on social, spatial and temporal proximity, and creating a news feed corresponding to the shared space. Using the example composited posting user interface 430 of FIG. 4C as an illustration, a first user (e.g., "Bill") may check in at a location "Coupa Cafe" from his GPS-equipped mobile device, and select one or more photos from his mobile device to post to the social networking system. The composited posting process may transmit an indication of a photo upload request and a current location to the social networking system, causing a server-side process of the social networking system to create or determine a shared space "College Reunion" for the photo upload request (e.g., based on a current event "College Reunion" common to the first user and other users who are requesting uploading photos from the same location), and transmit an identifier (e.g., a name) of the shared space to the first user's mobile device to be presented in the user in input field 432 of the example composited posting user interface 430. The first user may enter user names of two social contacts "Ally", "Mary" in input field 433, and enter a comment "Great place for a rainy afternoon" in input field 434. In response the first user's selecting of "Share" icon in the example composited posting user interface 430, the composited posting process may tag the first user and the two social contacts, the location "Coupa Cafe", and the comment to the one or more selected photos, and transmit a photo upload request for the one or more selected photos (or cause a photo-uploading tool to transmit the one or more selected photos) to the social networking system. The composited posting process may also transmit a location check-in request (e.g., checking in the two social contacts to the location "Coupa Cafe"), and a status update request (e.g., the first user's comment "Great place for a rainy afternoon") to the social networking system.

Figure 5A:
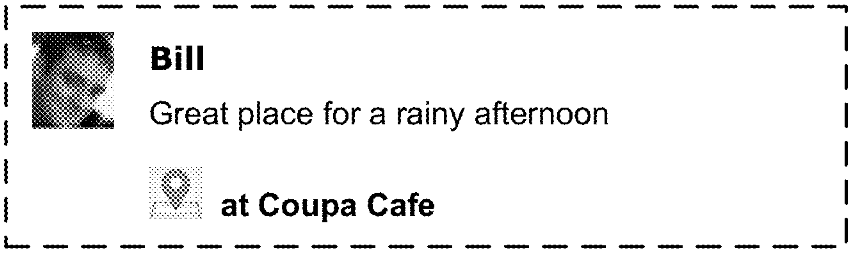
FIGS. 5A, 5B, 5D, and 5E illustrate example news feed entries.
Figure 5B:
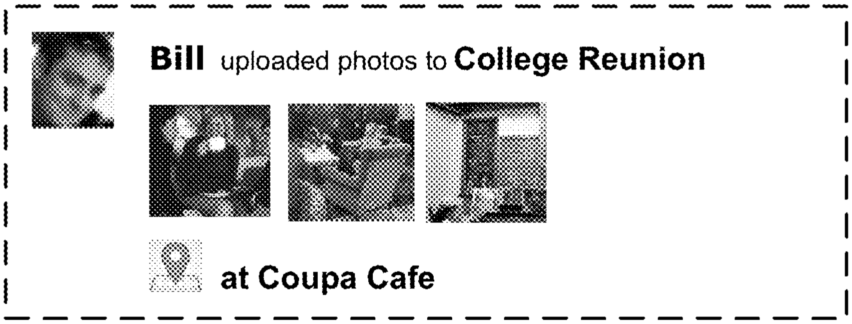
Figure 5C:
FIG. 5C illustrates an example display of a photo uploaded to a social networking system.
Figure 5D:
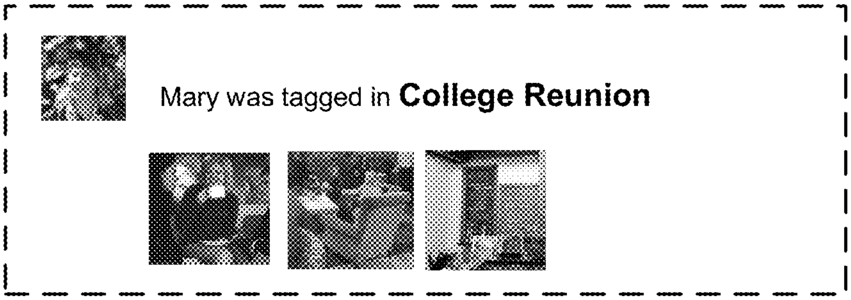
Figure 5E:
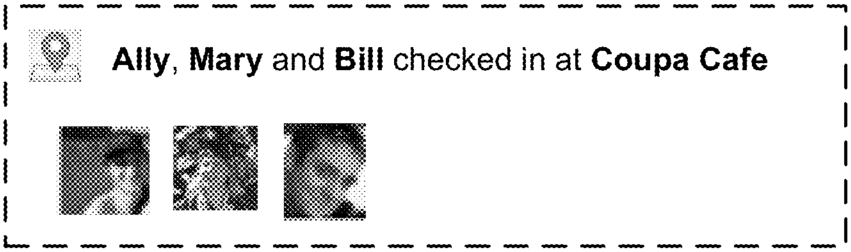

After receiving information for the first user's posting requests transmitted from the composited posting process, the social networking system may cause a first server-side process to store the uploaded photos in media database 104, and add the uploaded to the shared space "College Reunion". Additionally, the social networking system may cause a second server-side process to check in the two social contacts "Ally" and "Mary" to the location "Coupa Cafe" and store the check-in activities in location database 104. The social networking system may cause news feed engine 110 to create a news feed entry for the status update request including the first user (e.g., a user name, a profile picture thumbnail), the comment "Great place for a rainy afternoon" and the location "Coupa Cafe", as illustrated in FIG. 5A. Furthermore, the social networking system may cause news feed engine 110 to create a news feed entry about the first user's photo upload request, as illustrated in FIG. 5B. In the example of FIG. 5B, the news feed entry for a photo uploading activity may comprise the user requesting the photo upload (e.g., the first user "Bill"), the shared space that the photos were uploaded to (e.g., "College Reunion"), selectable thumbnails for the uploaded photos, and the location tagged to the uploaded photos (e.g., "Coupa Cafe"). A viewing user of the example news feed entry of FIG. 5B may select a photo thumbnail, causing a server-side photo-viewing process to transmit the selected photo (and its metadata) to the viewing user's client device to be displayed in a graphical user interface of the client device, as illustrated in the example of FIG. 5C. In the example of FIG. 5C, a display of a photo from a shared space can include the photo, a comment about the photo (e.g. "Great place for a rainy afternoon"), and users (e.g., corresponding user profile picture thumbnails) tagged in the photo. The social networking system may cause news feed engine 110 to create a news feed for one or more photo tagging activities, as illustrated in the example of FIG. 5D. In the example of FIG. 5D, the news feed entry for photo tagging activities can include one or more photos (e.g., corresponding selectable thumbnails) that an user (e.g., "Mary") was tagged to, and a shared space (e.g., "College Reunion") that the photos were uploaded to. The social networking system may cause news feed engine 110 to create a news feed entry for the check-in activities of the first user and the two social contacts, as illustrated in FIG. 5E.

Figure 6:
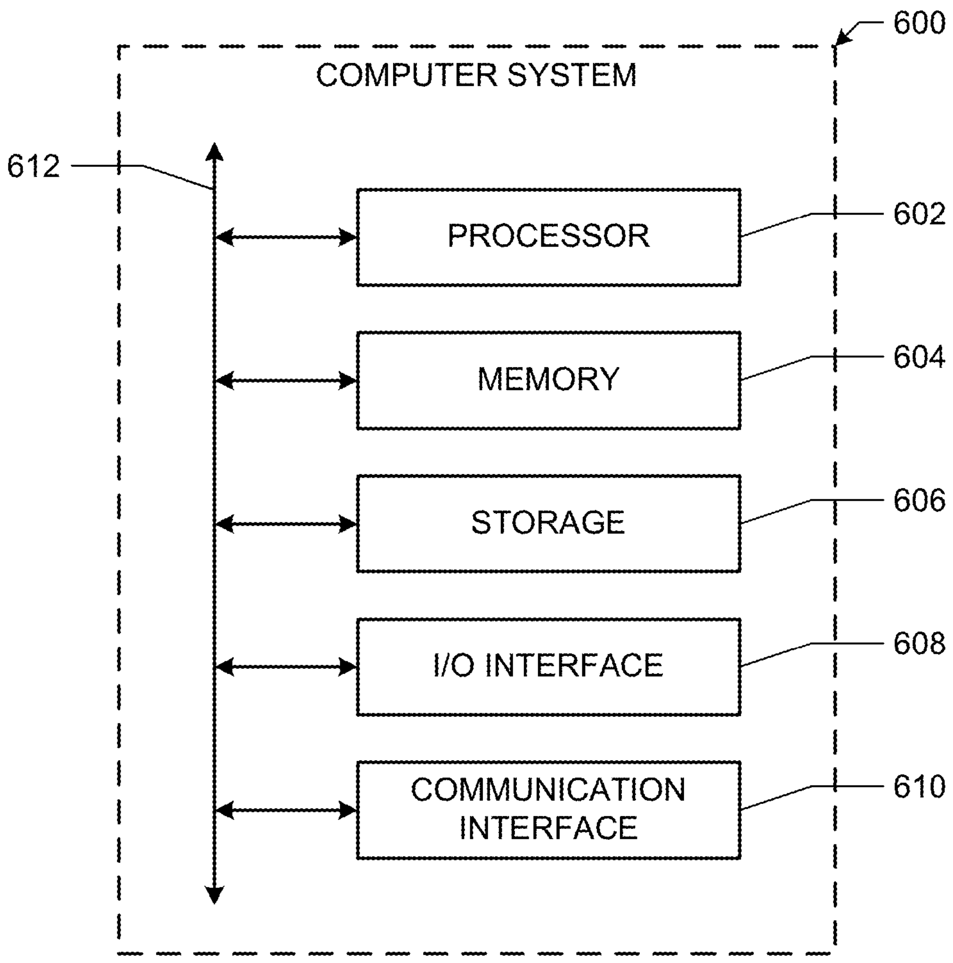
FIG. 6 illustrates an example computer system.

FIG. 6 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network (such as, for example, a 802.11a/b/g/n WI-FI network, a 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, a Long Term Evolution (LTE) network), or other suitable wireless network or a combination of two or more of these.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, a Advanced Microcontroller Bus Architecture (AMBA) bus, or another suitable bus or a combination of two or more of these. Bus 612 may include one or more buses 612, where appropriate.

Figure 7:
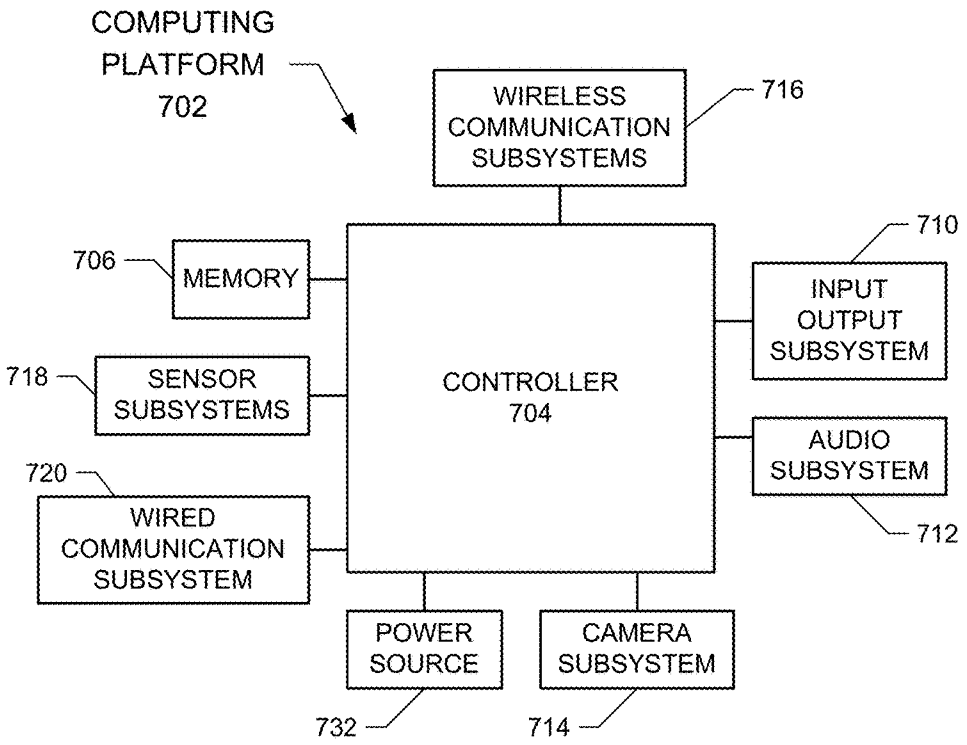
FIG. 7 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 7 shows a schematic representation of the main components of an example computing platform of a client or mobile device, according to various particular embodiments. In particular embodiments, computing platform 702 may comprise controller 704, memory 706, and input output subsystem 710. In particular embodiments, controller 704 which may comprise one or more processors and/or one or more microcontrollers configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702. By way of example, controller 704 may include one or more processors or one or more controllers dedicated for certain processing tasks of computing platform 702, for example, for 2D/3D graphics processing, image processing, or video processing.

Controller 704 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 706 that is operatively coupled to controller 704.

Memory 706 may encompass one or more storage media and generally provide a place to store computer code (e.g., software and/or firmware) and data that are used by computing platform 702. By way of example, memory 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory 706 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to controller 704. Information may also reside on one or more removable storage media loaded into or installed in computing platform 702 when needed. By way of example, any of a number of suitable memory cards (e.g., SD cards) may be loaded into computing platform 702 on a temporary or permanent basis.

Input output subsystem 710 may comprise one or more input and output devices operably connected to controller 704. For example, input output subsystem may include keyboard, mouse, one or more buttons, thumb wheel, and/or, display (e.g., liquid crystal display (LCD), light emitting diode (LED), Interferometric modulator display (IMOD), or any other suitable display technology). Generally, input devices are configured to transfer data, commands and responses from the outside world into computing platform 702. The display is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 710 may also include touch based devices such as touch pad and touch screen. A touchpad is an input device including a surface that detects touch-based inputs of users. Similarly, a touch screen is a display that detects the presence and location of user touch inputs. Input output system 710 may also include dual touch or multi-touch displays or touch pads that can identify the presence, location and movement of more than one touch inputs, such as two or three finger touches.

In particular embodiments, computing platform 702 may additionally comprise audio subsystem 712, camera subsystem 712, wireless communication subsystem 716, sensor subsystems 718, and/or wired communication subsystem 720, operably connected to controller 704 to facilitate various functions of computing platform 702. For example, Audio subsystem 712, including a speaker, a microphone, and a codec module configured to process audio signals, can be utilized to facilitate voice-enabled functions, such as voice recognition, voice replication, digital recording, and telephony functions. For example, camera subsystem 712, including an optical sensor (e.g., a charged coupled device (CCD), or a complementary metal-oxide semiconductor (CMOS) image sensor), can be utilized to facilitate camera functions, such as recording photographs and video clips. For example, wired communication subsystem 720 can include a Universal Serial Bus (USB) port for file transferring, or a Ethernet port for connection to a local area network (LAN). Additionally, computing platform 702 may be powered by power source 732.

Wireless communication subsystem 716 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). Additionally, wireless communication subsystem 716 may include hosting protocols such that computing platform 702 may be configured as a base station for other wireless devices. Other input/output devices may include an accelerometer that can be used to detect the orientation of the device.

Sensor subsystem 718 may include one or more sensor devices to provide additional input and facilitate multiple functionalities of computing platform 702. For example, sensor subsystems 718 may include GPS sensor for location positioning, altimeter for altitude positioning, motion sensor for determining orientation of a mobile device, light sensor for photographing function with camera subsystem 714, temperature sensor for measuring ambient temperature, and/or biometric sensor for security application (e.g., fingerprint reader).

In particular embodiments, various components of computing platform 702 may be operably connected together by one or more buses (including hardware and/or software). As an example and not by way of limitation, the one or more buses may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these. Additionally, computing platform 702 may be powered by power source 732.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:

by a computing device, sending instructions to present to a user a user interface for posting to a social-networking system, wherein the user interface comprises one or more input fields;

by a computing device, receiving an indication of the user requesting to post to a social-networking system primary information associated with a primary posting objective, the primary posting objective being a status update or a photo upload;

by the computing device, accessing a social graph associated with the user, wherein the social graph comprises a first node that corresponds to the user, a second node that corresponds to a content object, and an edge that connects the first node to the second node;

by the computing device, determining a secondary posting objective relevant to the primary posting objective based on the edge that connects the first node to the second node, the secondary posting objective being a location check-in, an event tag, or a user tag;

by the computing device, sending instructions to present to the user via the user interface one or more input fields that each correspond to one of the secondary posting objectives, wherein each of the input fields comprises one or more selectable items as suggestions for secondary information associated with the secondary posting objectives;

by the computing device, associating the primary information with the secondary information that was input by the user through one or more of the input fields that each correspond to one of the secondary posting objectives; and after associating the primary information with the secondary information, posting the primary and secondary information to the social-networking system as a composite post.

2. The method of claim 1, wherein one or more selectable items are presented in each of one or more of the input fields that each correspond to one of the secondary posting objectives, each of the selectable items suggesting to the user particular secondary information corresponding to the secondary posting objective that the input field corresponds to.

3. The method of claim 2, wherein selection by the user of a selectable item in an input field inputs for the user the particular secondary information suggested by the selectable item.

4. The method of claim 2, wherein the particular secondary information suggested by one of the selectable items in one of the input fields is:

a particular place associated with a current location of the user;

a particular event that the user is likely currently attending;

a particular social contact of the user within the social-networking system that the user is likely currently with; or a thumbnail of at least a portion of a particular photograph that the user has recently taken with the computing device.

5. The method of claim 1, wherein at least one of the input fields is a dialog box for entering text.

6. The method of claim 1, further comprising:

after associating the primary information with the secondary information, presenting to the user via the user interface the composite post.

7. An apparatus comprising:

one or more processors; and a memory coupled to the processors comprising instructions executable by the processors, the processors being operable when executing the instructions to:

send instructions to present to a user a user interface for posting to a social-networking system, wherein the user interface comprises one or more input fields;

receive an indication of the user requesting to post to a social-networking system primary information associated with a primary posting objective, the primary posting objective being a status update or a photo upload;

access a social graph associated with the user, wherein the social graph comprises a first node that corresponds to the user, a second node that corresponds to a content object, and an edge that connects the first node to the second node;

determine a secondary posting objective relevant to the primary posting objective based on the edge that connects the first node to the second node, the secondary posting objective being a location check-in, an event tag, or a user tag;

send instructions to present to the user via the user interface one or more input fields that each correspond to one of the secondary posting objectives, wherein each of the input fields comprises one or more selectable items as suggestions for secondary information associated with the secondary posting objectives;

associate the primary information with the secondary information that was input by the user through one or more of the input fields that each correspond to one of the secondary posting objectives; and after associating the primary information with the secondary information, post the primary and secondary information to the social-networking system as a composite post.

8. The apparatus of claim 7, wherein one or more selectable items are presented in each of one or more of the input fields that each correspond to one of the secondary posting objectives, each of the selectable items suggesting to the user particular secondary information corresponding to the secondary posting objective that the input field corresponds to.

9. The apparatus of claim 8, wherein selection by the user of a selectable item in an input field inputs for the user the particular secondary information suggested by the selectable item.

10. The apparatus of claim 8, wherein the particular secondary information suggested by one of the selectable items in one of the input fields is:

a particular place associated with a current location of the user;

a particular event that the user is likely currently attending;

a particular social contact of the user within the social-networking system that the user is likely currently with; or a thumbnail of at least a portion of a particular photograph that the user has recently taken with the computing device.

11. The apparatus of claim 7, wherein at least one of the input fields is a dialog box for entering text.

12. The apparatus of claim 7, wherein the processors are further operable when executing the instructions to:

after associating the primary information with the secondary information, present to the user via the user interface the composite post.

13. One or more computer-readable non-transitory storage media embodying software that is operable when executed to:

send instructions to present to a user a user interface for posting to a social-networking system, wherein the user interface comprises one or more input fields;

receive an indication of the user requesting to post to a social-networking system primary information associated with a primary posting objective, the primary posting objective being a status update or a photo upload;

access a social graph associated with the user, wherein the social graph comprises a first node that corresponds to the user, a second node that corresponds to a content object, and an edge that connects the first node to the second node;

determine a secondary posting objective relevant to the primary posting objective based on the edge that connects the first node to the second node, the secondary posting objective being a location check-in, an event tag, or a user tag;

send instructions to present to the user via the user interface one or more input fields that each correspond to one of the secondary posting objectives, wherein each of the input fields comprises one or more selectable items as suggestions for secondary information associated with the secondary posting objectives;

associate the primary information with the secondary information that was input by the user through one or more of the input fields that each correspond to one of the secondary posting objectives; and after associating the primary information with the secondary information, post the primary and secondary information to the social-networking system as a composite post.

14. The media of claim 13, wherein one or more selectable items are presented in each of one or more of the input fields that each correspond to one of the secondary posting objectives, each of the selectable items suggesting to the user particular secondary information corresponding to the secondary posting objective that the input field corresponds to.

15. The media of claim 14, wherein selection by the user of a selectable item in an input field inputs for the user the particular secondary information suggested by the selectable item.

16. The media of claim 14, wherein the particular secondary information suggested by one of the selectable items in one of the input fields is:

a particular place associated with a current location of the user;

a particular event that the user is likely currently attending;

a particular social contact of the user within the social-networking system that the user is likely currently with; or a thumbnail of at least a portion of a particular photograph that the user has recently taken with the computing device.

17. The media of claim 13, wherein at least one of the input fields is a dialog box for entering text.

18. The media of claim 13, wherein the software is further operable when executed to:

after associating the primary information with the secondary information, present to the user via the user interface the composite post.

* * * * *